US011940146B2

(12) United States Patent
Vissa et al.

(10) Patent No.: US 11,940,146 B2
(45) Date of Patent: Mar. 26, 2024

(54) SUPERHEATED STEAM AND EFFICIENT THERMAL PLASMA COMBINED GENERATION FOR HIGH TEMPERATURE REACTIONS APPARATUS AND METHOD

(71) Applicant: MHI Health Devices, LLC., Cincinnati, OH (US)

(72) Inventors: Ramgopal Vissa, Hyderbad (IN); Sajja Sriramu, Hyderbad (IN); Jainagesh Sekhar, Cincinnati, OH (US)

(73) Assignee: MHI Health Devices, Inc., Cincinnati, OH (US)

( * ) Notice: Subject to any disclaimer, the term of this patent is extended or adjusted under 35 U.S.C. 154(b) by 836 days.

(21) Appl. No.: 17/062,656

(22) Filed: Oct. 5, 2020

(65) Prior Publication Data

US 2021/0102698 A1 Apr. 8, 2021

Related U.S. Application Data

(60) Provisional application No. 62/969,722, filed on Feb. 4, 2020, provisional application No. 62/954,757, filed on Dec. 30, 2019, provisional application No. 62/942,767, filed on Dec. 3, 2019, provisional application No. 62/912,124, filed on Oct. 8, 2019.

(51) Int. Cl.

| | |
|---|---|
| ***F22G 1/16*** | (2006.01) |
| ***F24H 3/02*** | (2022.01) |
| ***F24H 3/04*** | (2022.01) |
| ***H05H 1/02*** | (2006.01) |

(52) U.S. Cl.

CPC ............... *F22G 1/165* (2013.01); *F24H 3/02* (2013.01); *F24H 3/0405* (2013.01); *H05H 1/02* (2013.01)

(58) Field of Classification Search

None

See application file for complete search history.

(56) References Cited

U.S. PATENT DOCUMENTS 1,451,880 A * 4/1923 Lightfoot ................ H05B 3/00 219/520
1,522,992 A * 1/1925 Abbott ..................... H05B 3/06 338/243
1,738,026 A * 12/1929 Wennagel ................ H05B 3/48 338/270
1,980,675 A * 11/1934 Fredenburgh ............. H01J 1/22 313/340
2,245,085 A * 6/1941 Abbott .................... F24H 1/102 392/491
2,247,816 A * 7/1941 McIlrath ................. F24H 1/162 392/494
2,258,836 A * 10/1941 Willner ..................... H01J 1/22 313/340
2,797,297 A * 6/1957 Nihlen .................... F24H 3/081 165/185
3,617,703 A * 11/1971 Ewart, Jr. ................ H05B 3/06 219/541

(Continued)

*Primary Examiner* — Thor S Campbell

(74) *Attorney, Agent, or Firm* — Michael C. Connelly

(57) ABSTRACT

Presented are devices and methods for the generation of high temperature plasma, wherein air or gas is projected past a heating element, or superheated steam produced by water projection on an element and combinations thereof utilizing a heat source comprising an electrically powered heating element in a double helical (DNA) shape which allows for an efficient generation of high heat output.

12 Claims, 12 Drawing Sheets

(56) References Cited

U.S. PATENT DOCUMENTS

| | | | | | |
|---|---|---|---|---|---|
| 3,804,158 | A * | 4/1974 | Kerstetter | H01J 9/06 | 432/59 |
| 3,885,126 | A * | 5/1975 | Sugiyama | G05D 23/1919 | 219/202 |
| 4,108,953 | A * | 8/1978 | Rocco | F02M 23/12 | 123/549 |
| 4,791,262 | A * | 12/1988 | Ando | H05B 6/108 | 219/674 |
| 5,058,196 | A * | 10/1991 | Nakamura | F24C 7/043 | 392/408 |
| 5,075,536 | A * | 12/1991 | Towe | F23Q 7/001 | 361/266 |
| 5,134,684 | A * | 7/1992 | Mishou | H05B 3/44 | 392/379 |
| 5,449,886 | A | 9/1995 | Zhu | | |
| 5,565,387 | A | 10/1996 | Sekhar | | |
| 5,878,192 | A * | 3/1999 | Jackson | F24H 9/1818 | 392/452 |
| 5,963,709 | A * | 10/1999 | Staples | F24H 1/101 | 392/379 |
| 6,816,671 | B1 * | 11/2004 | Reddy | F24H 3/0405 | 219/121.36 |
| 8,119,954 | B2 * | 2/2012 | Vissa | H05B 3/44 | 219/535 |
| 8,895,888 | B2 * | 11/2014 | Burada | B08B 7/00 | 219/121.48 |
| 9,249,492 | B2 | 2/2016 | Reddy | | |
| 9,376,771 | B2 | 6/2016 | Reddy | | |
| 9,643,877 | B2 * | 5/2017 | Sekhar | C03B 29/025 | |
| 9,867,232 | B2 * | 1/2018 | Mann | H05B 3/48 | |
| 9,970,678 | B2 * | 5/2018 | Kapila | F24H 3/022 | |
| 10,088,149 | B2 * | 10/2018 | Vissa | F22B 27/16 | |
| 10,677,493 | B2 * | 6/2020 | Sekhar | H05H 1/20 | |
| 2007/0145038 | A1 * | 6/2007 | Vissa | H05B 3/44 | 219/535 |
| 2010/0290766 | A1 * | 11/2010 | Mochizuki | H05B 3/78 | 392/503 |
| 2013/0098115 | A1 * | 4/2013 | Oecksler | C03B 27/012 | 65/370.1 |
| 2013/0264326 | A1 * | 10/2013 | Tiras | F27D 11/02 | 219/385 |
| 2016/0273758 | A1 * | 9/2016 | Fujimura | F22B 1/281 | |
| 2020/0080719 | A1 * | 3/2020 | Tonomura | F22G 1/165 | |

* cited by examiner

SUPERHEATED STEAM AND EFFICIENT THERMAL PLASMA COMBINED GENERATION FOR HIGH TEMPERATURE REACTIONS APPARATUS AND METHOD

CROSS-REFERENCE TO RELATED APPLICATIONS

This application claims the benefit of U.S. provisional applications 62/912,124 filed on Oct. 8, 2019, 62/942,767 filed Dec. 3, 2019, 62/954,757 filed on Dec. 30, 2019, and 62/969,722 filed on Feb. 4, 2020 the disclosures of which are incorporated by reference herein in their entireties. Also, features of the present application are based upon U.S. Pat. No. 5,963,709, entitled "Hot Air Blower Having Two Porous Materials and a Gap Therebetween" by Staples et al., U.S. Pat. No. 6,816,671, entitled "Mid Temperature Plasma Device" by Reddy et al., U.S. Pat. No. 10,088,149, entitled "One Atmosphere Boiler Instant Superheated Steam Apparatus And Method" by Vissa et al. and U.S. Pat. No. 10,677,493 entitled "Industrial Heating Apparatus And Method Employing Fermion And Boson Mutual Cascade Multiplier For Beneficial Material" by Sekhar all of which are incorporated by reference in their entireties as well.

BACKGROUND

Hot air blowers have been used for a variety of applications including direct heating of parts and surfaces, incineration of gas particulates and heating enclosed chambers. More particularly, hot air blowers are still being utilized for refractory curing, plastics sealing, cleaning diesel exhaust and retrofitting gas fired ovens and furnaces.

Blowers used for such applications typically comprised a blower fan, an electric heating element and a housing for the heating element. The blower forced air or gas into the housing through an inlet at one end of the blower. The air was then heated by convection and radiation as it passed near the heating element and was provided at the outlet end of the blower.

For better performance of the above applications, it became desirable to construct hot air blowers that could produce higher gas temperatures. Higher energy efficiency was desired as well. Furthermore, it became desirable to produce hot gas blowers which could produce and transfer plasma instead of simply un-disassociated hot gas since such a method dramatically improves the heat transfer coefficient. Also, the production of blowers of a design whereby, metallic elements contained therein, do not crack when the element attains a certain temperature relative to the air passing near the element was sought in the industry.

The above issues were addressed by U.S. Pat. No. 5,963,709, entitled "Hot Air Blower Having Two Porous Materials and a Gap Therebetween" by Staples et al. and U.S. Pat. No. 6,816,671, entitled "Mid Temperature Plasma Device" by Reddy et al. both of which are incorporated by reference in their entireties. Very hot gas and plasma were produced by forcing air or gas through multiple layers of a porous material producing a tortuous flow for the gas to travel through. The porous material was in layers, separated by an air gap, through which at least one heating element would pass. The gap provided a residence time for the gaseous flow to heat further. The tortuous flow, combined with the residence time provided by the gap and the resulting convective and radiative heat, would thereby produce a plasma.

Currently, even more energy efficient and higher temperature and plasma activity generators are needed in science and industry. A device employing the amplification of fermions and bosons present in the plasma, which will meet current needs, is described in the present application. Thus, by simple means but non-intrusive methods, considerable heat can be ionically transported.

SUMMARY

Process gas heaters intended to heat gases lighter than air have huge efficiency problems. This application teaches a heating assembly where the heater and current carrying member are aligned in the direction of flow. The flow could be along a rifled or straight path containing a heating element. When it flows along the heating element, the heating process has been discovered to be very efficient. Such a heater and its associated flow may increase the fermions in the flow as well.

It has been found that industrial heaters using straight "U" shaped heating elements produce an ionic plume but tend to burn out at higher temperatures due to high surface heat transfer coefficients. Elements of orthogonal coil configuration have low surface loads, optimize the energy per unit volume and do not burn out quickly, but do not optimize the heat transfer coefficient. Proposed here is a heater using a heating element having a double helical configuration similar in geometry to a strand of DNA. Such a configuration will produce higher temperatures with activated species. The devices and methods described herein are anticipated for use with a variety of fluids. Gases, including air are contemplated as well as water in its liquid and gaseous phases. Superheated steam may be produced and generate its own thermal plasma or may be combined with high temperature gases to achieve desired results.

High Coil Density is good for power density but bad for heat transfer. High alignment (straight element) with gas flow is best for fermion production as it operates for very high heat transfer, but this shape cuts down power density availability. If the objective is plasma production this arrangement is sufficient. If the objective is high temperature output, then DNA configuration is better. If the objective is long life but low efficiency, then orthogonal coil is a good choice. Coil in coil elements meet these objectives but not as well as the DNA configuration.

Another contemplated option for increased efficiency is through the introduction of water, to generate steam, into the heat generating device. A mist, or droplets, of water may be projected into the system near or within a heating element configuration leading to beneficial results. An important detail is to get flexible temperature and steam flow rate by a method to regulate water inlet by a combination of trim valves and porous ceramic. This is proposed herein.

Generation of thermal plasma is presented through the heating of water and/or gas to temperatures capable of producing plasma with activated species or with vibratory-shear characteristics. While water (steam) and gas (air) are discussed specifically, it is anticipated that the devices described can be utilized and operated with any fluid generally, including air and water. Thus, it is not intended that the apparatus or methods herein be limited to applications utilizing merely water (steam) or air. Other gases and liquids are contemplated.

DRAWING—FIGURES

DRAWINGS—REFERENCE NUMERALS

Figure 1:
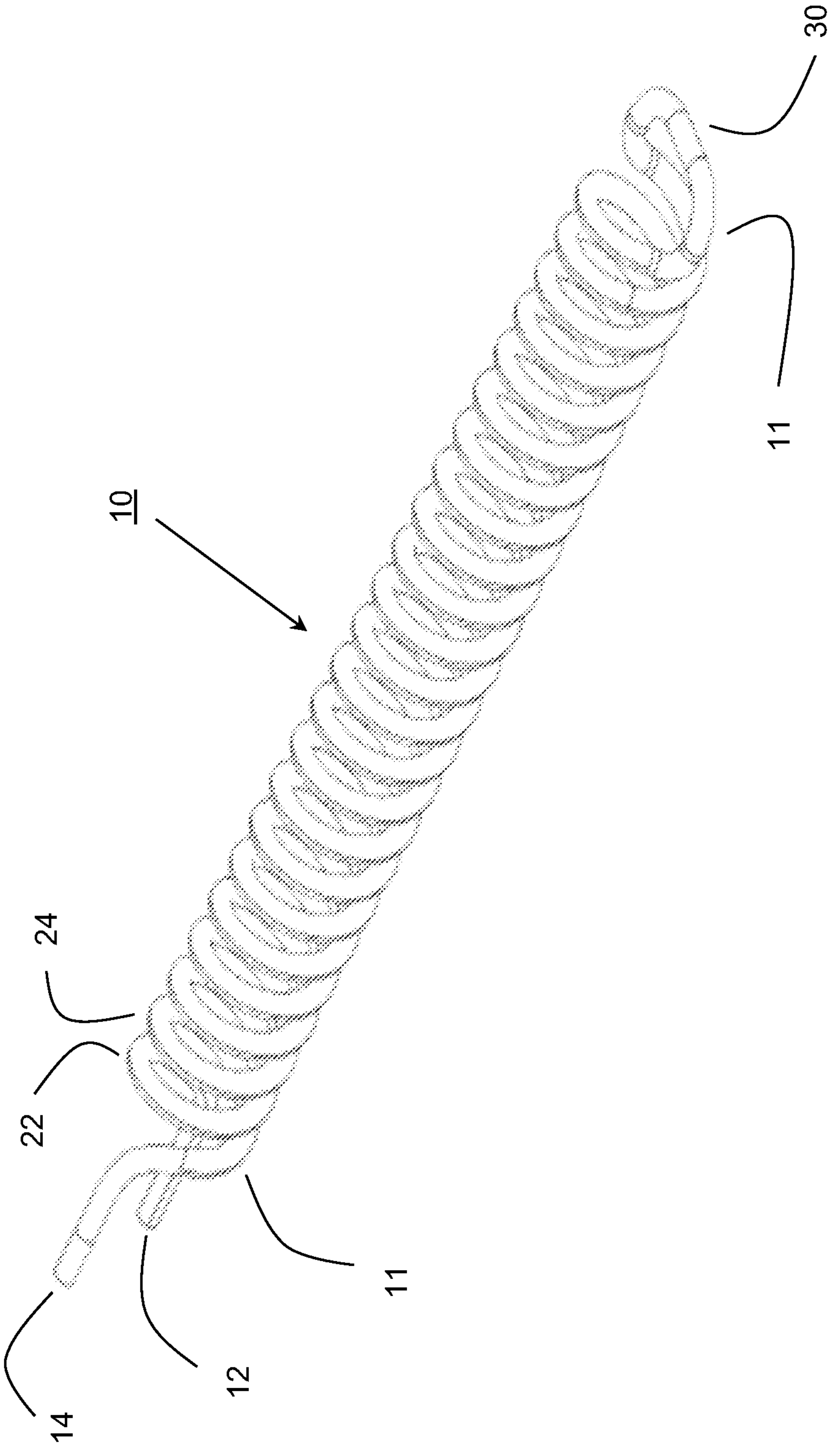
FIG. 1 is an isometric view of an embodiment a double helical configured heating element employed in the high temperature plasma or steam generation device.
Figure 2:
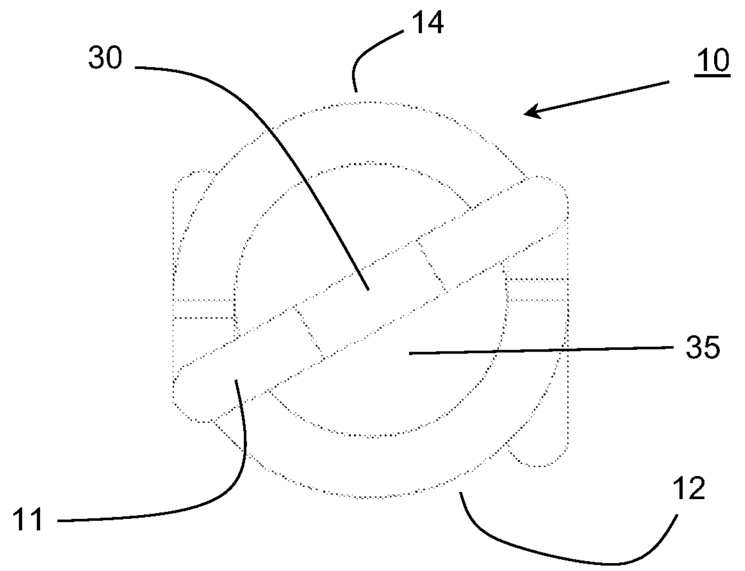
FIG. 2 is the apex end view of an embodiment of a double helical configured heating element employed in the high temperature plasma or steam generation device.
Figure 3:
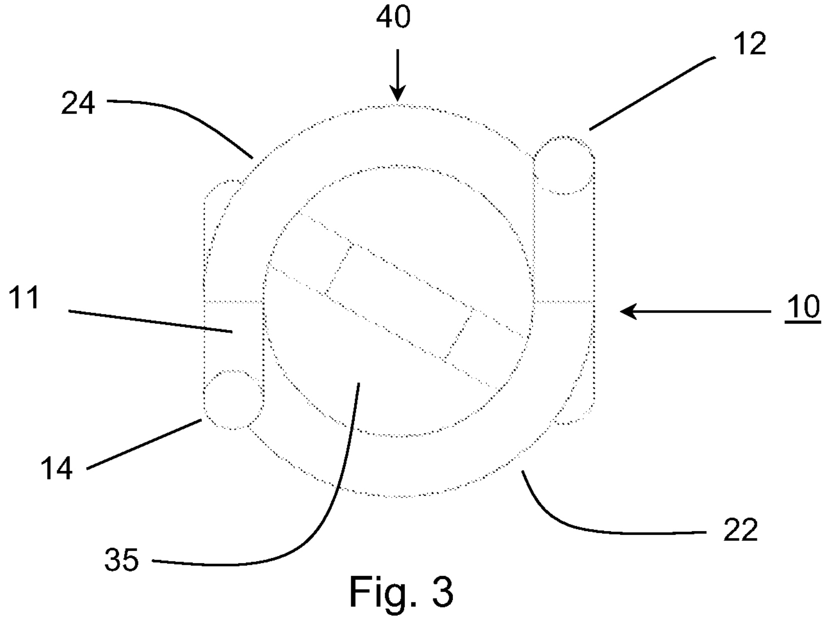
FIG. 3 is the terminal end view of an embodiment of a double helical configured heating element employed in the high temperature plasma or steam generation device.
Figure 4:
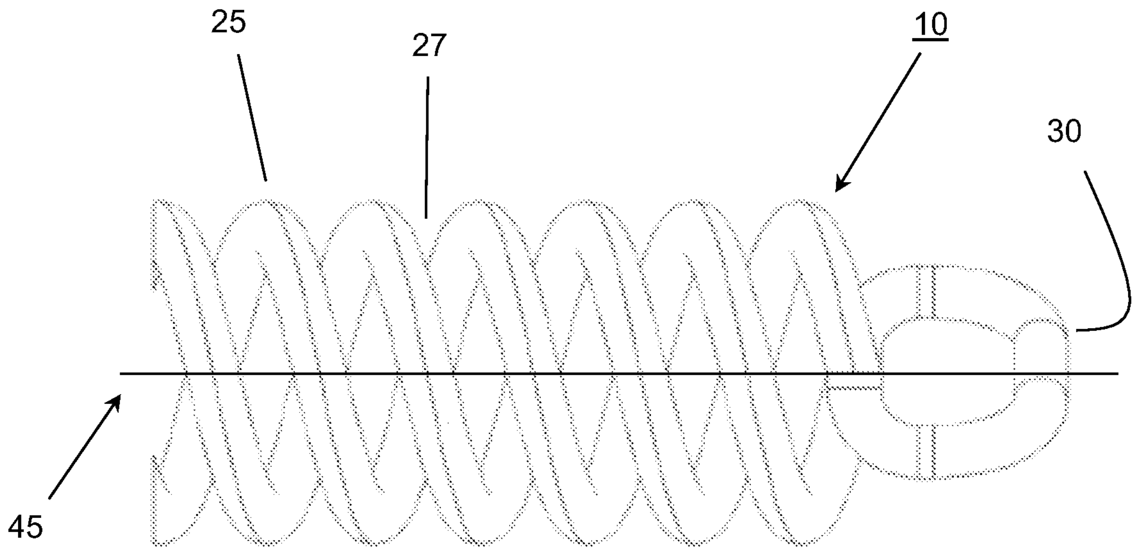
FIG. 4 is a side view of a section of a double helical configured heating element employed in the high temperature plasma or steam generation device.
Figure 5:
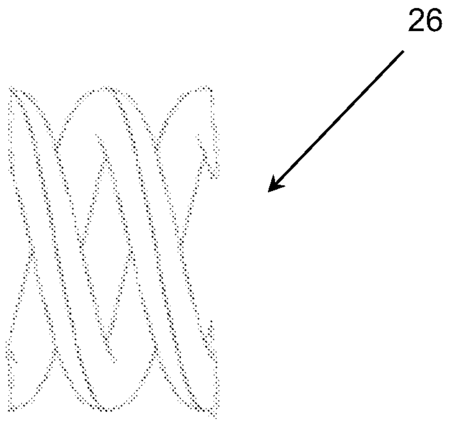
FIG. 5 is a side view of one coil segment of the double helical configured heating element.
Figure 6:
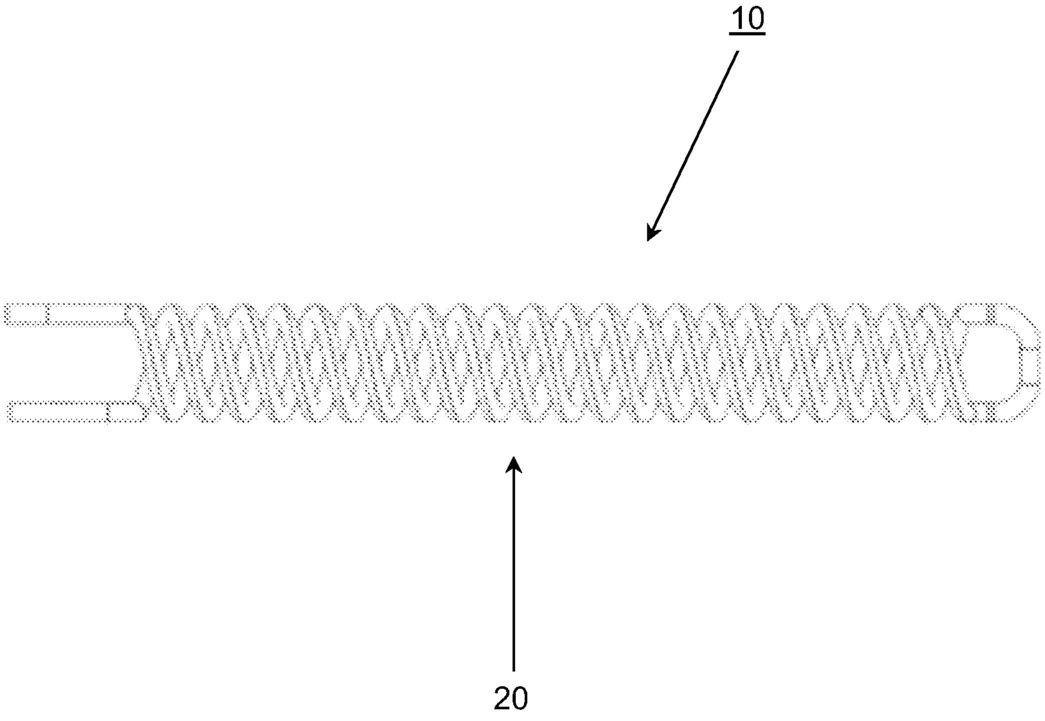
FIG. 6 is side view of an embodiment of a double helical configured heating element employed in the high temperature plasma or steam generation device.

| | |
|---|---|
| 10 | double helical heating element |
| 11. | element member |
| 12 | first element terminal |
| 14 | second element terminal |
| 17 | power connection |
| 20 | element length |
| 22 | first coil |
| 24 | second coil |
| 25 | coil angle |
| 26 | coil segment |
| 27 | coil spacing |
| 30 | member apex |
| 35 | element interior |
| 40 | element diameter |
| 45 | central axis |
| 100 | plasma generator |
| 102 | casing |
| 103 | intake end |
| 104 | exhaust end |
| 107 | intake flange |
| 109 | exhaust flange |
| 110 | intake cap |

-continued

| | |
|---|---|
| 112 | intake cap flange |
| 115 | gas intake |
| 120 | exhaust cap |
| 122 | exhaust cap flange |
| 125 | exhaust port |
| 130 | flange bolt |
| 140 | refractory |
| 142 | channel |
| 150 | thermocouple port |
| 200 | superheated steam generator |
| 210 | water inlet |
| 215 | manifold |
| 216 | manifold flange |
| 220 | water lines |
| 300 | combination superheated steam and plasma generator |
| 305 | auxiliary gas inlet |

Descripton

High Energy Plasma Generation

Although it is the practice of (many industrial heaters) to use coils for improving power density, the goals are always to keep the watt density as low as possible for the same temperature while increasing the surface loading. There appears to be an optimal heating element configuration between coil (which has the member orthogonal to the flow) and a straight member element to obtain the above goals. This optimal configuration is herein referred to as a DNA type heating member due to its resemblance to the double helical shape of a DNA strand. The watt density vs. surface loading is much better than orthogonal coil and the straight member design. This not only speaks to safer and longer life of the element, it gives much more room to increase surface loading for higher temperatures. A brief comparison of the three designs is below.

TABLE 1

| ELEMENT DESIGN | DNA | Coil | Straight |
|---|---|---|---|
| Surface Loading | 4 | 2.92 | 7 |
| Watt Density | 7.76 | 7.78 | 5.75 |
| T-out equivalent | 1100° C. | 900° C. | 1000° C. |

Also, the total reflective surface (Refractory surface for actual heat transfer) in the DNA type is twice that of than the straight element and 151% more than the orthogonal coil. DNA Element testing conditions: The surface loading (from cold) was ramped up on the element to 4 w/cm$^2$ in about 20 mins. The temperature stabilized at ~860°. From there, the surface loading was taken to 5 w/cm$^2$. The temperature stabilized at 1050° C. and ran for about 20 mins. The CFM at the start was set to 14.2.

TABLE 2

| Resulting Readings | | | | |
|---|---|---|---|---|
| Surface Loading | Voltage | Current | Power | Temperature |
| @ 4 w/cm$^2$ | 56 V | 118 A | 6.7 kW | ~850° C. |
| @ 5 w/cm$^2$ | 63 V | 132 A | 8.36 kW | ~1050° C. |

These are unanticipated and unexpected findings. It has been found that an unusual rapid heating can be created, as well as, transfer of surface activation by using a comparatively long order of (10-1000 cm) current carrying member with none, or some curvature (radius of curvature, two curvatures looking like a DNA molecule), and >80 amps current with penetration of the current carrying members into spaces that could have any cross sectional geometry (e.g. circular holes, ellipsoids or square cross section) in a high temperature resistant stable material. The holes are expected to have a diameter in the range of millimeters to tens of millimeters.

For the best temperature performance (best temperature output for a given flow rate and power) the gradient along the member is important in order to obtain a lower Power density. The gradient is high for a straight member, but power density is very low. For an orthogonal coil the power density is high, but the gradient is low. DNA type configurations have the best performance. Since the DNA type element improves the ability to reach higher temperatures (which is very difficult to get in light gasses) this situation is ideal for use with light gasses such as $H_2$ and $H_2O$ (steam).

In one embodiment, the apparatus consists of long current carrying members contained in a plurality of channels. In such an apparatus, extremely hot temperatures are achieved. The channels may be from 0.1 mm to 100 mm in diameter. Currents passing through the current carrying members may range from 80 to 350 amps. Voltages, unlike those used in plasma devices, can be small with frequencies remaining in the Hz range when AC current is used. Unique reactions of the type including hot $CO_2(g)+NaN_3=C+NaO_2+1.5N_2(g)$, $C(s)+H_2O(g)\Leftrightarrow H_2(g)+CO(g)$ for $CO_2$ removal or $19Fe+4N(g)+O(g)+3H_2O(g)=Fe_3O_4+4Fe_4N+3H_2(g)$ which can easily be catalyzed or enabled by key fermions and bosons and actuated species. Cavitation and pressure differentials promote fermions and are additionally stimulated by bosons.

In another embodiment, the channels or holes through which the current carrying members are between 6-12 mm in diameter. These channels may be surrounded by a series of smaller channels or holes at around 1 mm in diameter. The smaller channels may differ in size and in cross-sectional shape from each other. The smaller holes may be arranged symmetrically or asymmetrically around the current carrying member channels and may follow the path of the member channels in a parallel, or near parallel, manner. Such smaller channels assist in the production of greater output temperatures for the device. The DNA sits in self threaded grooves in the refractory in an embodiment or may be positioned in strait walled channels. Partial or complete contact with the walls of the channels by the DNA elements is anticipated as well. This will prevent any deformation. The refractory material used with DNA members need not be porous as is required with other element configurations but may be if desired. There may be multiple DNA shaped elements utilized as well.

A preferred embodiment of the device for an enhanced process gas heater particularly for lighter than air gasses such as steam and hydrogen is described below. The gas heating device comprises an outer casing, constructed of suitable high temperature resistant materials, having an intake end and an exhaust end. The intake end is fitted with an intake cap which has an intake port positioned and designed to allow the introduction of a gaseous flow into the casing. A means to project the gaseous flow would be located at the intake cap and in communication with the intake port. The intake cap may have one or more power access ports which allow access into the intake cap for electrical, control and any other necessary connections. The intake cap is equipped with an intake thermocouple port to measure the temperature of incoming gas. A mid-casing thermocouple port and at least one exhaust thermocouple port are positioned on the casing allowing for temperature readings within the heating device. The casing is also fitted with an exhaust cap with an exhaust port attached at the exhaust end of the casing. In this embodiment, the casing is round in cross section with an elongated strait configuration resulting in a cylindrical appearance, but other geometries are contemplated. The casing may have a casing flange on each end that mate up with a corresponding intake cap flange and exhaust cap flange. Suitable gasket material may be positioned between the flanges which are attached with bolts.

A high temperature resistant ceramic, refractory or other suitable material is positioned inside of the casing. The intake cap and the exhaust cap may also be lined with a ceramic material. In this embodiment, the ceramic material is comprised of a refractory core inside of an insulating wrap. The refractory core extends, in an uninterrupted manner, the length of the casing and has at least one channel cut or formed through the length of the core parallel to the elongated strait dimension of the casing. The channels are sized to accept current carrying members. The diameters of the channels and the members are designed to allow the gaseous flow to be directed through the channels axially along the length of, and in contact with, the members. Further channels may be included through the length of the core to allow extra flow of the gas. The core may be in one piece or in multiple sections abutted together and may be covered with an insulating wrap.

In the present embodiment of the heating device the current carrying members are each configured as double helixes (Shaped in the manner of DNA molecules). Each DNA molecule will be positioned inside of its own channel in which it may be threaded. The DNA element will have partial or complete contact with the inner walls of the channel along the entire length of the element. Each DNA element has a pair of terminal ends attached at the intake end of the heater by which a power source is electrically connected to the elements. At least one element will be fitted within the core. The elements are encased in the core along their entire lengths with no gaps in the core and in this manner are the channels and core are uninterrupted along their lengths. As stated, the terminal ends of the elements project out at the intake end of the core. The heating elements are held snugly within the channels, but there is enough clearance for the gaseous flow to travel through the channels while making direct contact with the members. Heat is thus transferred from the current carrying members to the flow. Parallel channels may also be present in the core material allowing gaseous flow and heat transfer from the members and the core to the gaseous flow.

The generated plasma may be a wide-area electro-shear-vibratory-thermal plasma which is expected to primarily enhance vibrational excitations in a flowing gas without the need for electrode discharge. For the most part, this plasma has activated states, but can also give rise to electron exchanges and electron shell rearrangements. This type of plasma, due to not requiring electrodes for generation, has the advantages of scalability and of allowing rapid input for sundry part-introduction and change-out, which are a must for volume production. The main benefits of such are energy efficiency and wide-area stable plasma conditions, which include, the very difficult to achieve, open-plume stable configurations required for gasses like steam. This plasma has no combustion requirements (highly environmentally positive) and offers a clearly reduced cost of processing in all configurations (inline or open discharge configurations). The application of this type of coil arrangement allows such stable steam plasmas to be produced for the first time.

Operation

In operation, a gaseous flow is forced by a means of projection into the intake end of the process gas heater. As stated, the means of forcing the gaseous flow into the heating device may be a fan, compression or other instrumentalities. The gaseous flow is pushed through a block or core of high temperature resistant material having channels or grooves cut into the core. The channels contain current carrying members which are connected to a power source allowing the members to be electrically charged to produce a desired heat. The gaseous flow is driven through the channels by, and in contact with, the heated members thereby picking up heat from the channels and the core material. The flow is to be along the long axis of the current carrying members and not across this axis. The core may also have parallel channels not containing heating elements allowing more pathways for the gaseous flow to travel through the core. The flow is constricted in the channels and is in constant contact with heated members and/or core material from the intake end to the exhaust end of the core. The gas flow may show electrical conductivity because of the fermions such as electrons. However, the electrical resistance will be measured in mega-ohms.

Superheated Steam Generation

An exemplary embodiment of the present application will use water in a mist or droplet form applied to heated surfaces or heating elements to almost instantly, efficiently and controllably convert the water into superheated steam. The method and apparatus of this embodiment will perform the generation of superheated steam at one atmosphere without the need of a conventional boiler and all the drawbacks that the use of such entails. The generation of steam may be started and stopped quickly as desired. Such steam generation is detailed in U.S. Pat. No. 10,088,149.

The apparatus of the exemplary environment is comprised of a water supply, a water misting means, a superheated steam generator comprising, a steam chamber, heated surfaces, a steam outlet and a means of application, refractory material and a ceramic sponge (porous ceramic material). A supercharger that can also handle any residual mist may also be included to heat the superheated steam to even higher temperatures.

The exemplary, and further, embodiments of the instant steam apparatus may use greater than 2/r for a surface area/heat volume equivalent wire heater where r is the diameter of the heating wire. It is also envisioned that flat heaters or elements may be used as well. Several of the element shapes and types are disclosed in U.S. Pat. Nos. 5,449,886, 5,565,387 having electrical conductivity and other publications and are incorporated by reference in their entireties.

A key part of the apparatus and method is related to boiling efficiency. It has been determined, for this apparatus, that liquid from a spritzer or atomizer (misting means) or in the form of a film applied to a hot surface are effective forms of liquid for the production of instant steam. It has also been found that 18 ml/min of atomized or misted water applied to a surface at a temperature greater than 100° C. with a heat content of greater than 2 kJ will produce instantly boiled water at a rate of 1 kg/hr. The apparatus of this application teaches away from commonly known principles of boiling.

In operation of one embodiment, water will be drawn from a reservoir and may be converted to a fine mist or into droplets by a spray control nozzle, or other means, and immediately injected onto hot surfaces or hot electric heating elements located within the steam chamber. Nozzle size can be 0.5 mil to 20 mil (1 mil=1/1000 inch). The water is not required to be heated before conversion to mist or injection into the generator but may be if desired. When the mist enters the chamber, it will come into immediate contact with heated surfaces found within and be instantly converted into superheated steam. The hot surfaces may be made of materials including but not limited to metals, non-metals, semiconductors, ceramics, plastics, polymers composites and metal-like materials. The chamber will be insulated in such a manner as to allow the conversion of the water droplets into superheated steam. Insulation material used may be those commonly known to those skilled in the art. This apparatus and method provides a steam making rate that far surpasses that found in the prior art.

The high rate of steam production is accomplished in part due to the nature of atomized water. Tiny water droplets found in misted water may produce 1000 times its volume in steam when it comes in contact with heated surfaces. If these heated surfaces experience radiative, convective or conductive heat in an extremely well insulated chamber the steam may become superheated. The apparatus of the present application provides these conditions. The hot surfaces are high electron conductivity surfaces with electrons in the conduction band. The apparatus and method avoid line phase spinodals and produce a high purity gas that is waterless. The apparatus ascends $P_{sat}$, $T_{sat}$ and all spinodals along the two phase boundary of water/steam. Mist and steam are allowed to pre-mix.

The apparatus and method of the present application require only the heating of a mist to steam. No heater is needed to heat the water to an initial gaseous state prior to superheating. The steam is truly produced on demand since no steam is ever present until the misting means is actuated, and a mist of water is projected onto the hot surfaces providing instant steam. There is no wait as the steam is produced when the mist contacts the heated surfaces contained within the chamber. Current standard boilers have to be idled. Once the hot surfaces are at operating temperature the apparatus will instantly produce steam, and thus the only time needed is the time necessary to convert water to mist and contact the mist to the heated surfaces within the chamber.

A major feature of this apparatus and method is the instant conversion of liquid to gas. It is well known that boiling of a liquid is a difficult phenomenon when the liquid is confined within a container. This difficulty has been overcome by the embodiments of the instant superheated steam apparatus disclosed herein.

For instant boiling the temperature of the surface should be greater than 100° C. While boiling the temperature of the surface should not fall below a certain value. Surfaces with a temperature of >100° C. have an approximate heat content of 2 kJ. Those with a surface temperature of >200° C. have an approximate heat content of 1 kJ while surfaces with a temperature of >300° C., >400° C., >500° C. and incrementally up to >2000° C. have decreasing approximate heat contents respectively depending on the specific heat. This kW of power being applied (1-1000) and kJ of retained power (0.5-1000) and temperature of surface influence the boiling time and boiling efficiency as well as antimicrobial efficiency.

Hybrid heaters, i.e. using electrical, magnetic, combustion (and combustion gases), electrochemical, electrostatic and other means are fully contemplated. If used for power generation, a part of the power can be used for keeping the heating elements hot. Co-generation is fully possible, i.e. combinations of heat and work can be outputted for the steam produced.

A system utilizing hybrid heating is also anticipated where, along with instant steam being produced through the contact of water with electrically heated surfaces, a combustion gas is utilized as well. The energy efficiency of such a system would be an increase over that of the prior art. A hybrid system would efficiently produce heat and work from the combustion of the gas as represented by the equation $(T_1-T_2)Q/T_2$, ($T_1$=higher temperature; $T_2$=lower temperature; Q=amount heat transferred between $T_1$ and $T_2$) while offering the benefits of the instant production of steam via the reaction of the misted water on the hot surfaces. The use of electricity alone to heat a surface is inherently less efficient in producing work than in using a combustion reaction since some form of combustion or other reaction occurred to originally produce the electricity. Naturally ensuing losses would be less where the combustion itself generates the heat, or augments the heat, produced by electricity to heat the surfaces of the present application.

An embodiment is therefore envisioned where a means of combustion is directed onto the surfaces thereby heating them to a temperature necessary to convert water to instant steam as described above. The combustion means may be a burning gas and may be the sole provider of heat to the surfaces or may be used along with electrically or otherwise activated heat sources in a hybrid manner. Hollow configured electric heating elements may contain combustion gases for a combined heat. Other heat sources that may be used in a hybrid manner may comprise magnetic heat, radiation heat, friction heat or electron heat, etc.

Embodiments may also comprise thermocouples for temperature readout or control. Insulation may be provided when necessary around the steam chamber cover, steam outlet, supercharger or wherever needed for safety. Other features that embodiments may comprise include but are not limited to the following: external power supply, power control, external water pump, steam trap, excess water line, drain and collection vessel, pressure valves, temperature readout and/or external water supply. Steam with ozone and ozone like products is feasible in other embodiments. Other chemicals can be introduced into either fluid, i.e. prior to misting or after gasification or at both stages. Chemicals that alter surface tension of the mistable liquid are fully considered as well.

The heating elements may be silicides and other nonmetallic materials. They can be comprised of materials that contain Ni, Fe, Cr, stainless steels, Al, and Co. The heating elements may have graded layers, including coatings and nano-structures. Nano-features and nano-elements are fully envisioned as well such as disclosed in U.S. patent application Ser. Nos. 12/092,923, 13/318,366, 13/656,870 and 13/877,345 filed by the present applicants which are incorporated by reference in their entirety. Such materials would provide better erosion and corrosion (including biochemical corrosion) protection. Use of other liquids, suspensions, oils and colloids for making novel output gas or gas-steam mixtures is contemplated including organic and inorganic materials (salts, metal, liquids, mists, etc.). The terminals of the elements may be comprised of stainless steel with the remainder of the element comprised of material. In other applications the heating elements may be comprised of a single material.

Plasma/Superheated Steam Combination Generator

A combination of the above described superheated steam generation and thermal plasma production with a generator comprised of double helical (DNA) shaped heating elements gives unanticipated results. A device is anticipated combining the generation of an air/gas plasma utilizing a double helical coil with the generation of superheated steam wherein the superheated steam is introduced to a plume of plasma generated as described above. The plasma and steam may be generated in the same unit or steam generated in one unit may be introduced into a plasma generator. Another embodiment may introduce the plasm into the generated steam. Multiple units may be coupled as well.

DETAILED DESCRIPTION

FIGS. 1-6 describe a double helical configured (DNA shaped) heating element 10 which may be electrically powered. There is only one heating element in the following embodiment and, therefore, the element 10 is regarded as the "primary" element by default. An embodiment below (FIG. 13) will have a second element regard as a "secondary" element. An embodiment of the heating element 10 may be described as a double helically configured heating element member 11 comprised of a first terminal 12 delineating a first coil 22 in a clockwise direction away from the first terminal 12 around a central axis to the member apex 30 where the member 11 delineates a second coil 24 in a counter-clockwise direction towards the first terminal 12 ending at a point adjacent to the first terminal 12 thereby forming a second terminal 14 wherein the first coil 22 and the second coil 24 do not come into contact and form an element interior 35 within the first coil 22 and second coil 24 and along the central axis 45. The apex 30 provides a joining point between the coils and may be flat, rounded, concave, convex, acute, twisted or formed in other geometries depending on the application. The first coil 22 and the second coil 24 thereby wrap around a central axis 45 forming an element diameter 40. The heating element 10 may be comprised of any standard element material while the terminals 12 and 14 may be comprised of stainless steel or other suitable alloys.

Figure 14:
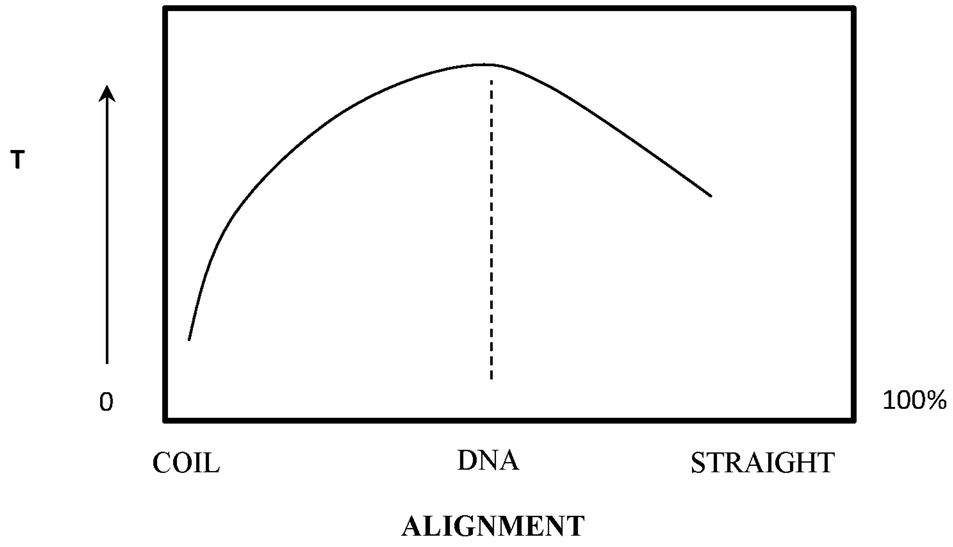
FIG. 14 represents a graph showing percent alignment of the flow along the heating element versus the output temperature employing the double helical configured heating element.
Figure 15:
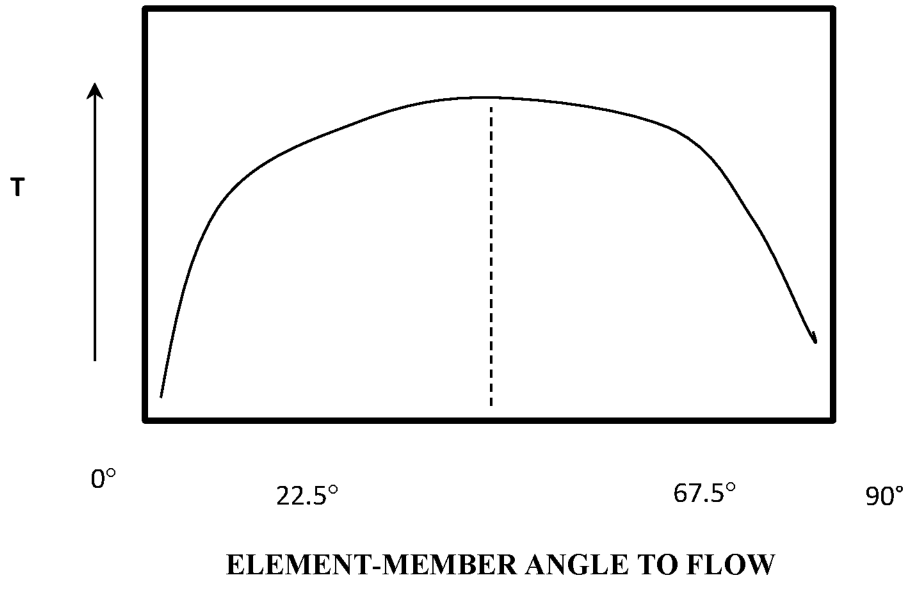
FIG. 15 represents a graph showing angle of heating element to the flow versus output temperature employing the double helical configured heating element.

The central axis 45 is a line projecting through the center of the interior 35 formed by the first coil 22 and the second coil 24 approximately parallel to the terminals 12 and 14. In the case of a fluid heating device, the central axis 45 runs parallel to the flow of the fluid as well. The coil angle 25 measures the angle of the coil 22 or 24 to the central axis 45 of the heating element 10 or the direction of the fluid flow. In the case of a straight heating element, the flow of the gas runs parallel to the centerline of the element member or at 0° to it. In the case of an orthogonal coiled element configuration, a fluid flow projected long the centerline of the heating element is at 90° to the element member (coil). The double helical configuration of heating element 10 provides an optimal temperature and element life at a coil angle 25 between 22.5° and 67.5° to the central axis 45 of heating element 10 as depicted in FIGS. 14 and 15. The heating element 10 may have equal or symmetric coil angles 25 and spacing between the individual coil segments 27 may be the same along the complete length 20 of the element 10, but is also anticipated that the coil angles 25 or pitches and distances (spacing) between the coil segments 26 may vary along the length 20 of the heating element 10. A coil segment 26 is defined as a length of coil material 360° around the central axis 45 of the heating element 10 or a single complete loop of the coil. The diameter of the coils 22 and 24 and the coil segments 26 may be symmetric or varying along the length 20 of the heating element 10.

Figure 7:
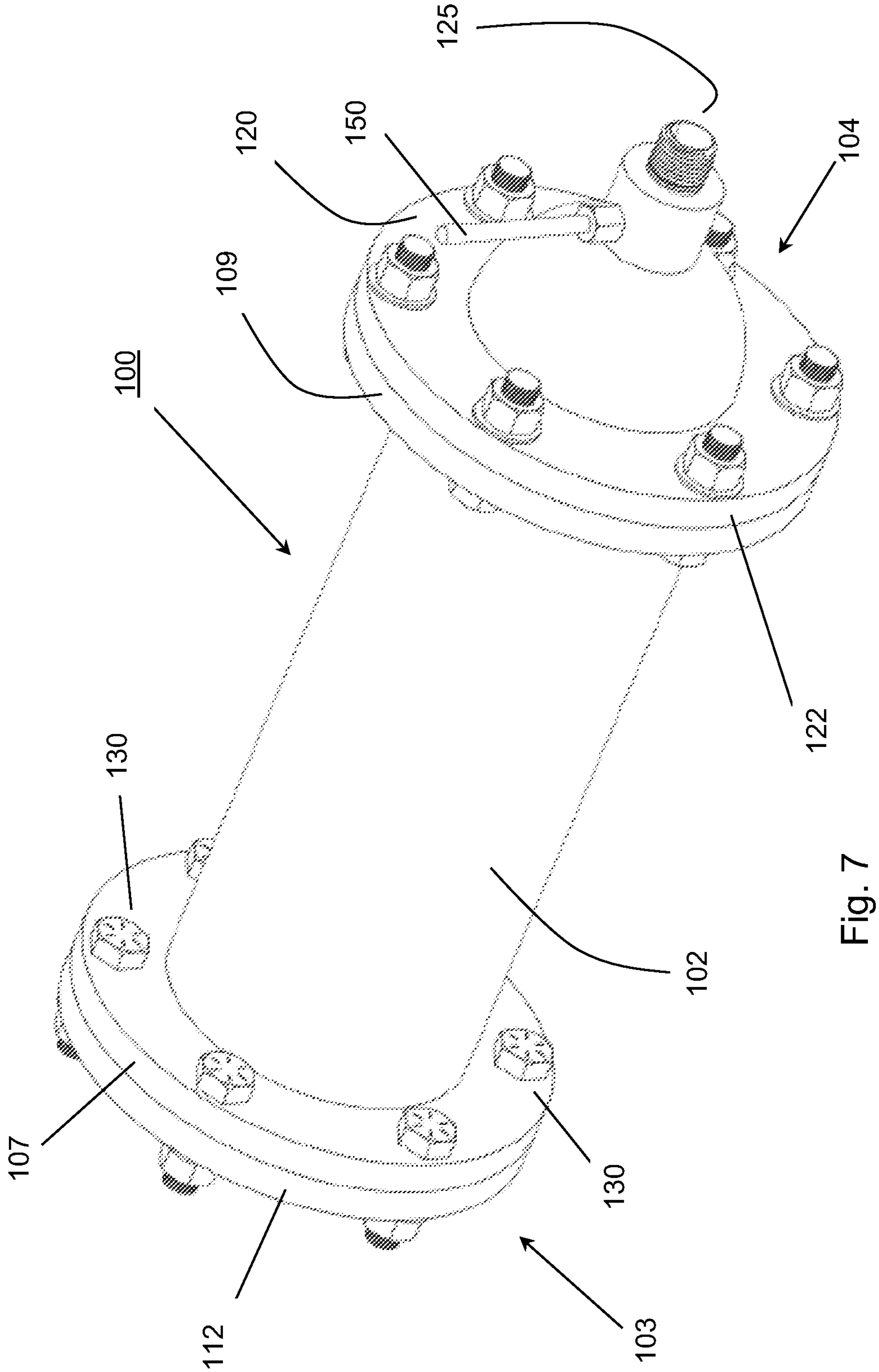
FIG. 7 is an isometric view of an embodiment of the high temperature plasma generation device employing the double helical configured heating element.
Figure 8:
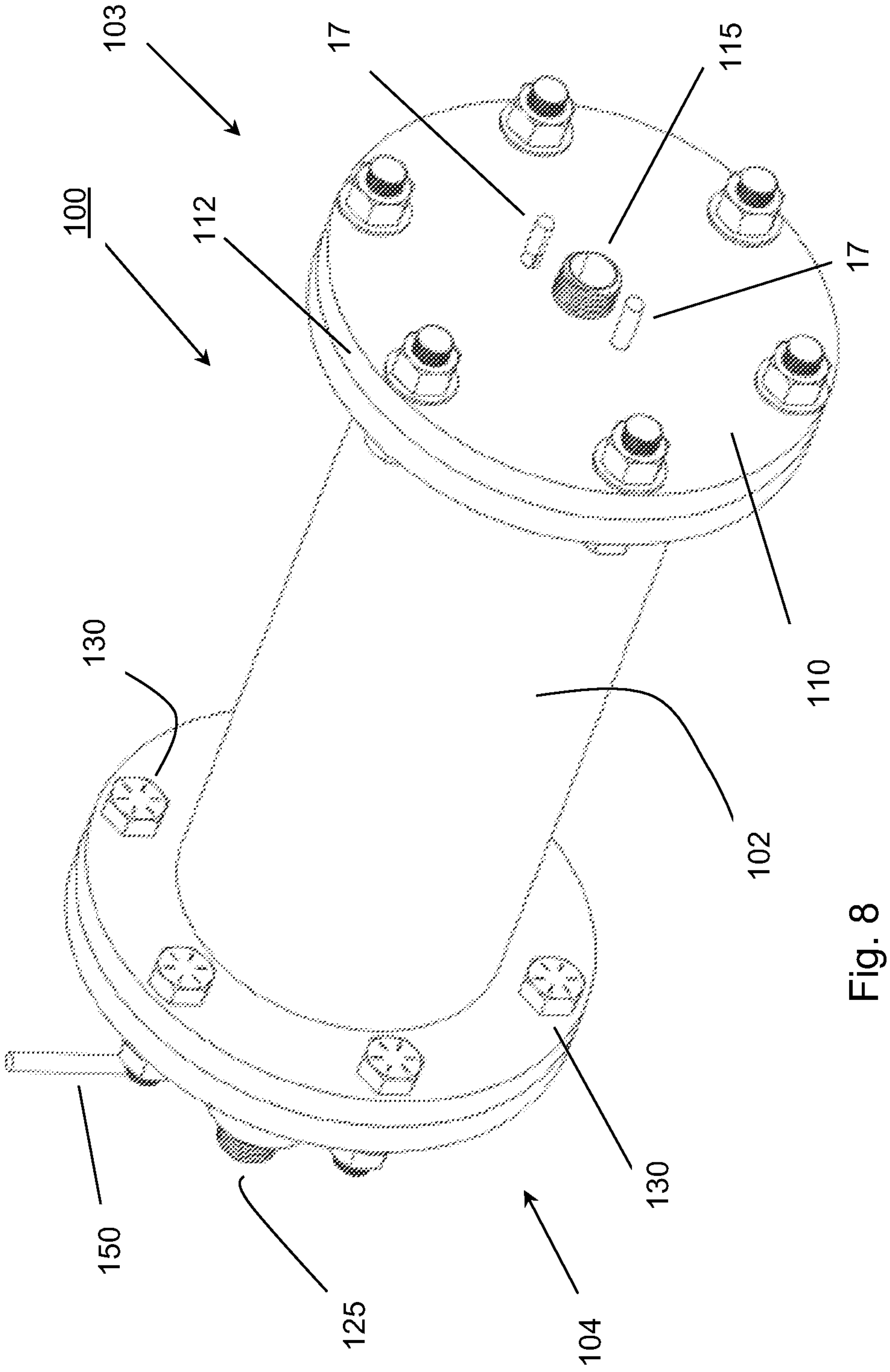
FIG. 8 is an isometric view of an embodiment of the high temperature plasma generation device employing the double helical configured heating element.
Figure 9:
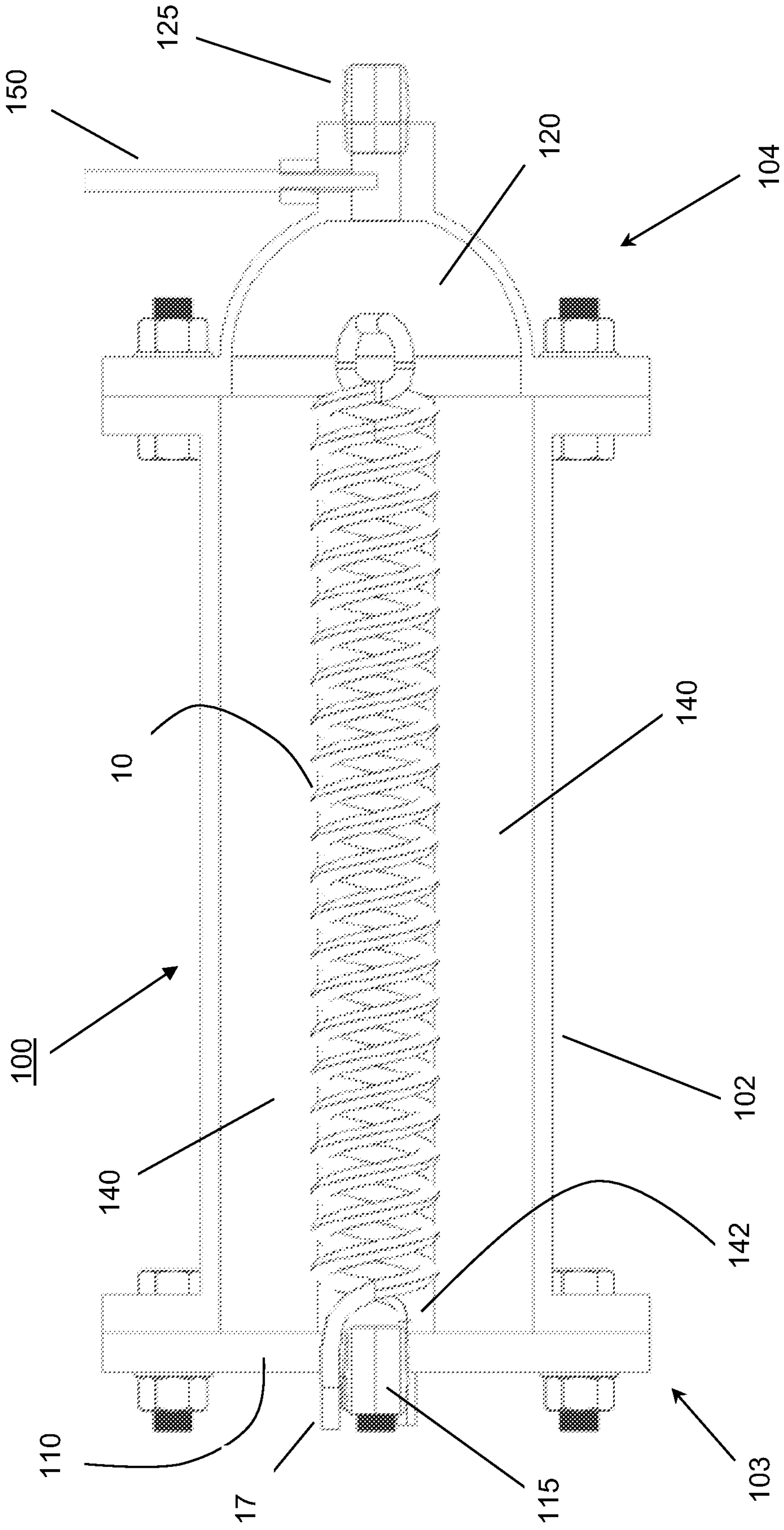
FIG. 9 is a cut away view of the embodiment of the high temperature plasma generation device employing the double helical configured heating element.

FIGS. 7-9 present an embodiment of a plasma generating device 100 comprised of a casing 102 having an intake end 103 terminating in an intake flange 107 and an exhaust end 104 terminating in an exhaust flange 109. In this embodiment the casing 102 is tubular in configuration though other geometries are anticipated. On the intake end 103 of the casing 102 is an intake cap 110 having an intake cap flange 112 which is attached to the exhaust flange 107 by multiple flange bolts 130 and gas intake 115 attached to a gas or air supply (not pictured). The air or gas source may be under some pressure, such as a pump, to provide a positive flow of gas into the generator 100.

An exhaust cap 120 is attached to the exhaust flange 109 by flange bolts 130 to the exhaust cap flange 122 of the exhaust cap 120. The exhaust cap 120 terminates at exhaust port 125. The gas source may be under some pressure such as a pump or a fan to provide a positive flow of gas into the generator 100. The casing 102 and the exhaust cap 120 may be provided with a thermocouple port 150 if desired.

The interior of the casing 102 is lined with refractory 140 which may be porous. Refractory material may be broadly defined as an insulation region and could be gas, solid, porous solid, liquid, plasma or combinations thereof. The refractory 140 defines a channel 142 in which a double helically configured heating element 10 is contained. The element 10 may be in contact with the refractory 140. The channel 142 may have straight walls in contact with element 10 or the channel 142 may have a rifled or grooved surface corresponding to the geometry of coils 22 or 24 of the heating element 10 allowing for a tight fit. A core of refractory material 140 may be positioned within the element interior 35. A power source (not pictured) provides electrical current to power connections 17 which are attached to the terminals 12 and 14 of the element 10. The power connections 17 and thermocouple part 150 may be positioned elsewhere if necessary.

Figure 10:
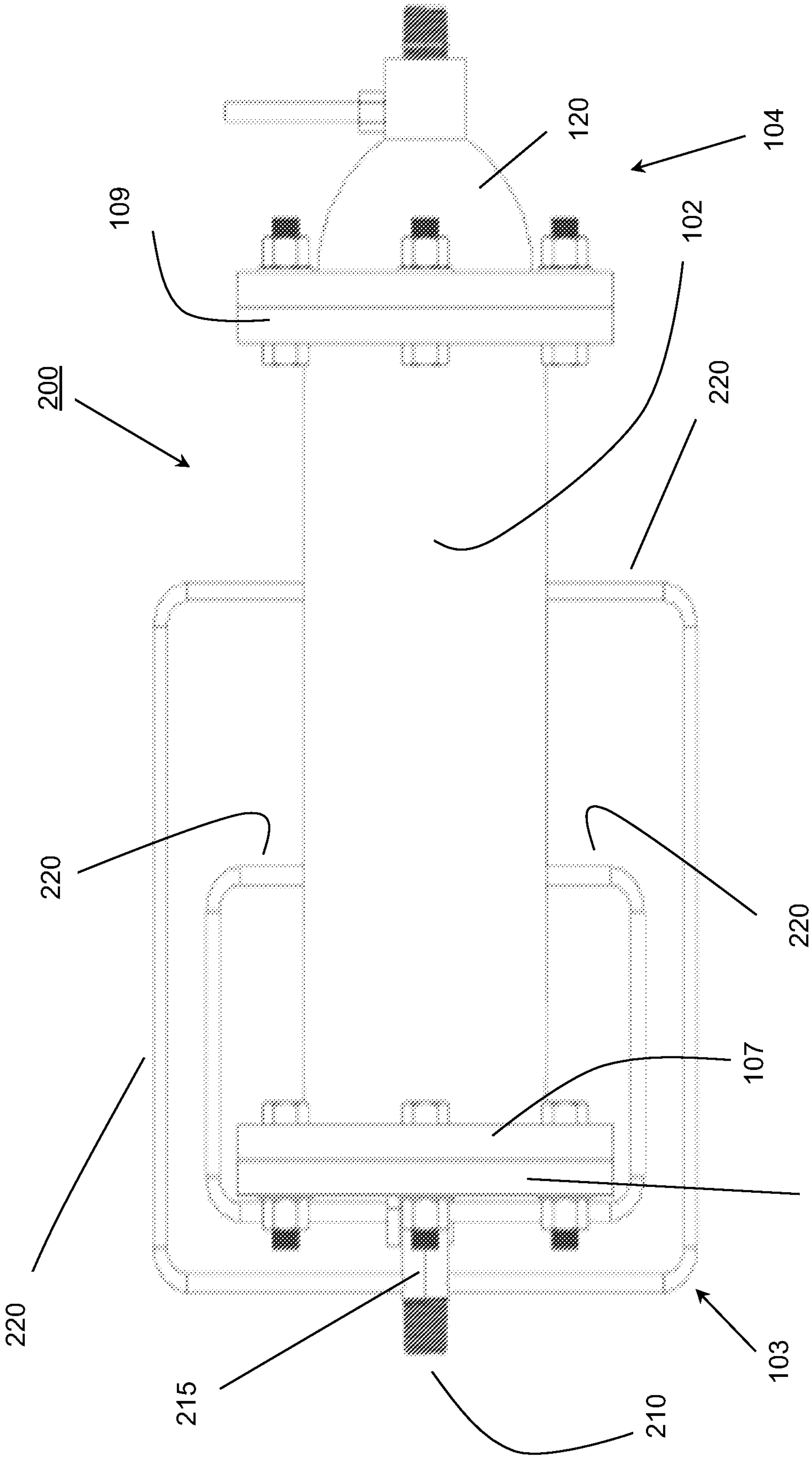
FIG. 10 is a side view of an embodiment of a high temperature superheated steam generation device employing the double helical configured heating element.
Figure 11:
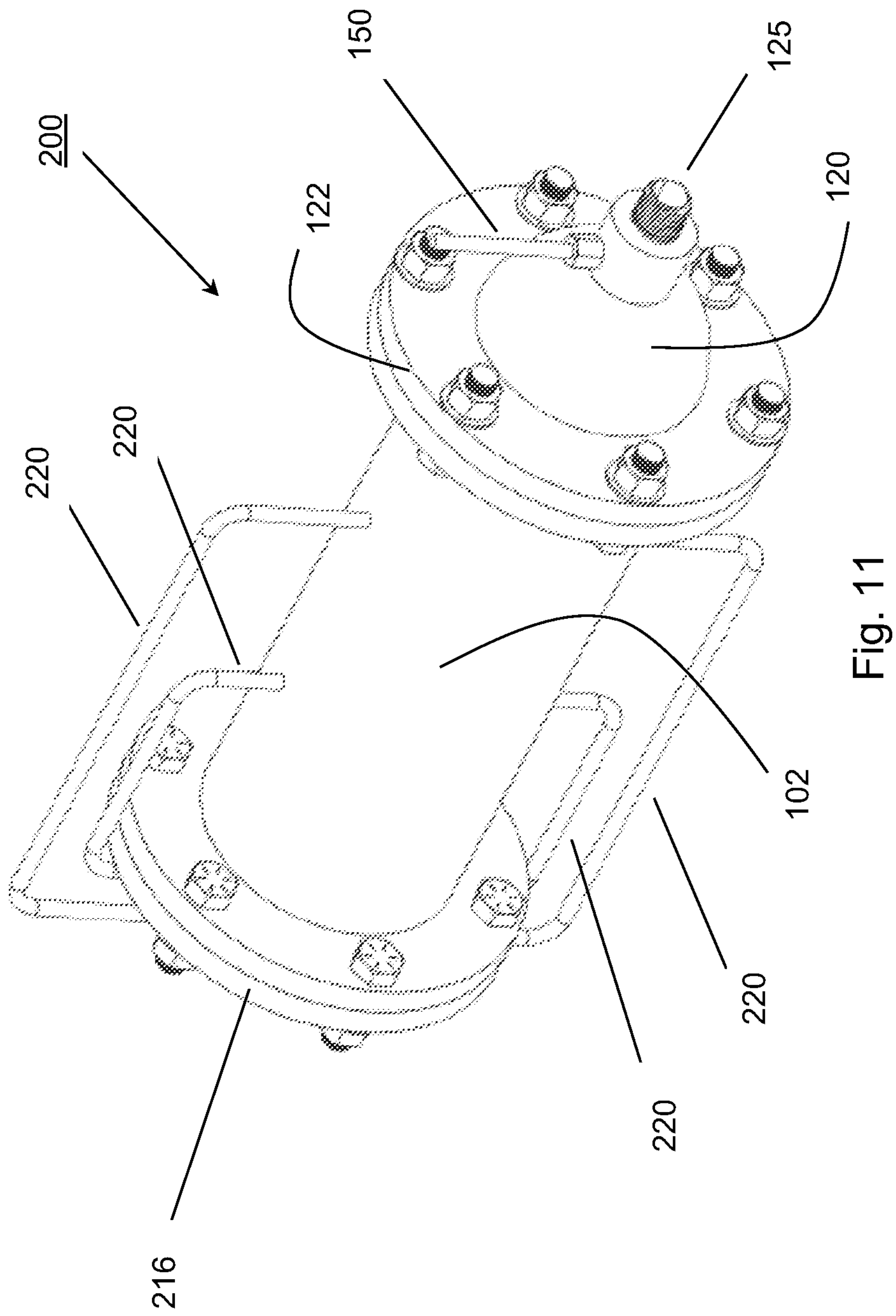
FIG. 11 is an isometric view of an embodiment of a high temperature superheated steam generation device employing the double helical configured heating element.
Figure 12:
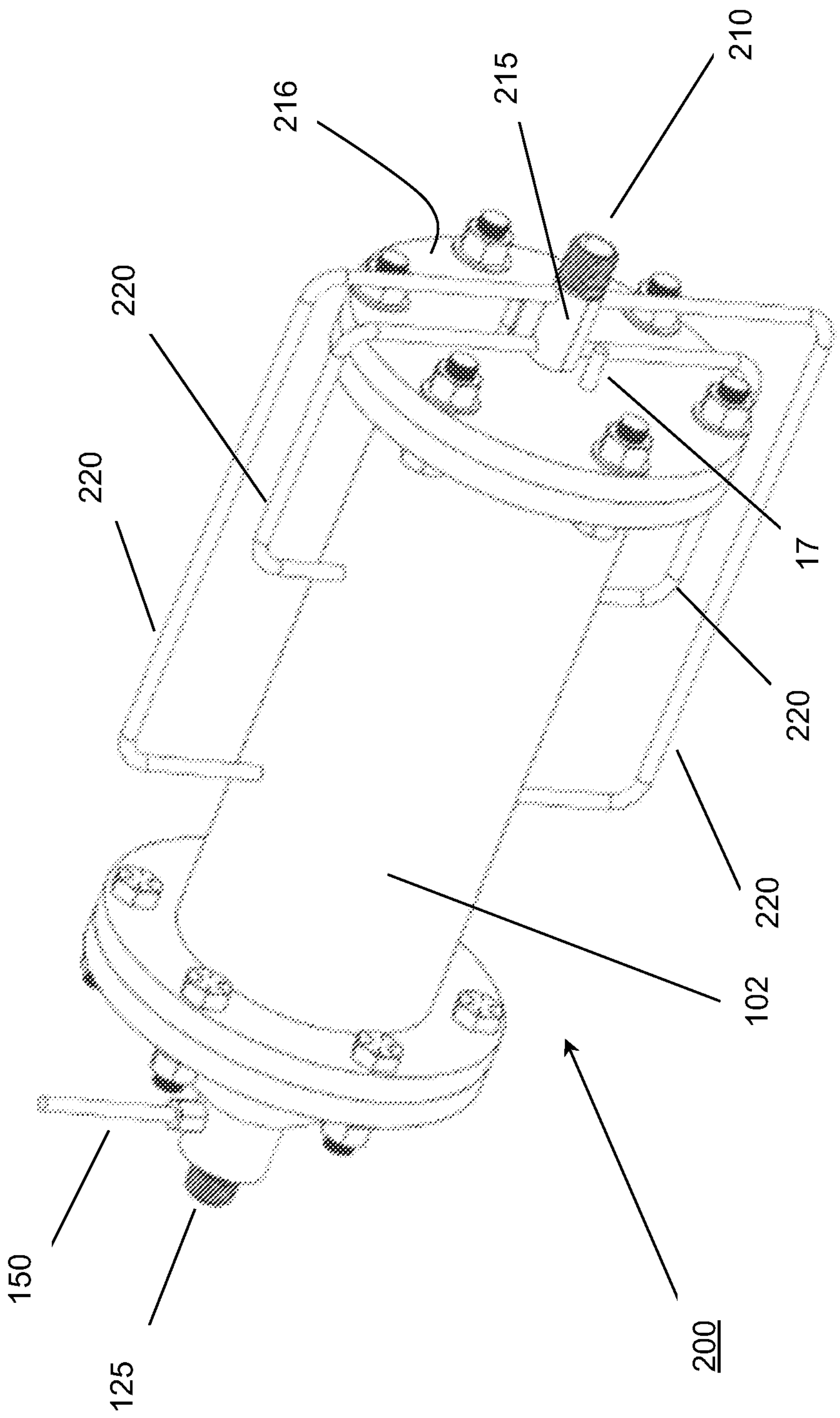
FIG. 12 is an isometric view of an embodiment of a high temperature superheated steam generation device employing the double helical configured heating element.

FIGS. 10-12 show superheated steam generator 200 that is comprised of many of the same features as the plasma generator 100. The superheated steam generator 200 is comprised of a casing 102 having an intake end 103 terminating in an intake flange 107 and an exhaust end 104 terminating in an exhaust flange 109. In this embodiment the casing 102 is tubular in configuration though others are anticipated. On the intake end 103 of the casing 102 is a manifold 215 having a manifold flange 216 which is attached to the exhaust flange 107 by multiple flange bolts 130 and water inlet 210 attached to a water supply (not pictured). The water may be de-ionized. Water lines 220 connect the manifold 215 to and through the casing at pre-determined positions to distribute the water to desired locations along the length of the generator 200. The water source may be under some pressure, such as a pump, to provide a positive flow of water into the steam generator 200.

An exhaust cap 120 is attached to the exhaust flange 109 by flange bolts 130 to the exhaust cap flange 122 of the exhaust cap 120. The exhaust cap 120 terminates at exhaust port 125. The water source may be under some pressure such as a pump to provide a positive flow of water into the generator 200. The casing 102 and the exhaust cap 120 may be provided with thermocouple ports 150 if desired. A pressure gauge (not pictured) may also be affixed to the casing 120.

As described previously for plasma generating device 100, the interior of the casing 102 of steam generator 200 is lined with refractory 140 which may be porous. The refractory 140 defines a channel 142 in which a double helically configured heating element 10 is contained. The element 10 may be in contact with the refractory 140. The channel 142 may have straight walls in contact with element 10 or the channel 142 may have a rifled or grooved surface corresponding to the geometry of coils 22 or 24 of the heating element 10 allowing for a tight fit. A core of ceramic sponge material may be positioned within the element interior 35. A power source (not pictured) provides electrical current to power connections 17 which are attached to the terminals 12 and 14 of the element 10. The power connections 17 and thermocouple ports 150 may be positioned elsewhere if necessary.

The water that is introduced into the casing 102 via the water lines 220 comes into contact with the refractory 140, which is pierced by the water lines 220 within the casing 102 and may be converted into steam upon contact with the heating element 10. As the water/steam mix makes its way through the water lines 220 and the refractory 140 towards the heating element 10 it picks up more heat and efficiently becomes superheated.

Superheated steam is generated at one atmosphere by the generator 200. Pressure does not build up in the generator since the exhaust port 125 is open to the atmosphere. Impingement of the water on the hot heating element 10 provides an expansion of the water allowing for it to be expelled from the generator 200 under its own power. No pressurization of the steam is therefore necessary. The superheated steam is at a temperature and condition to allow the generation of thermal plasma with activated species.

Figure 13:
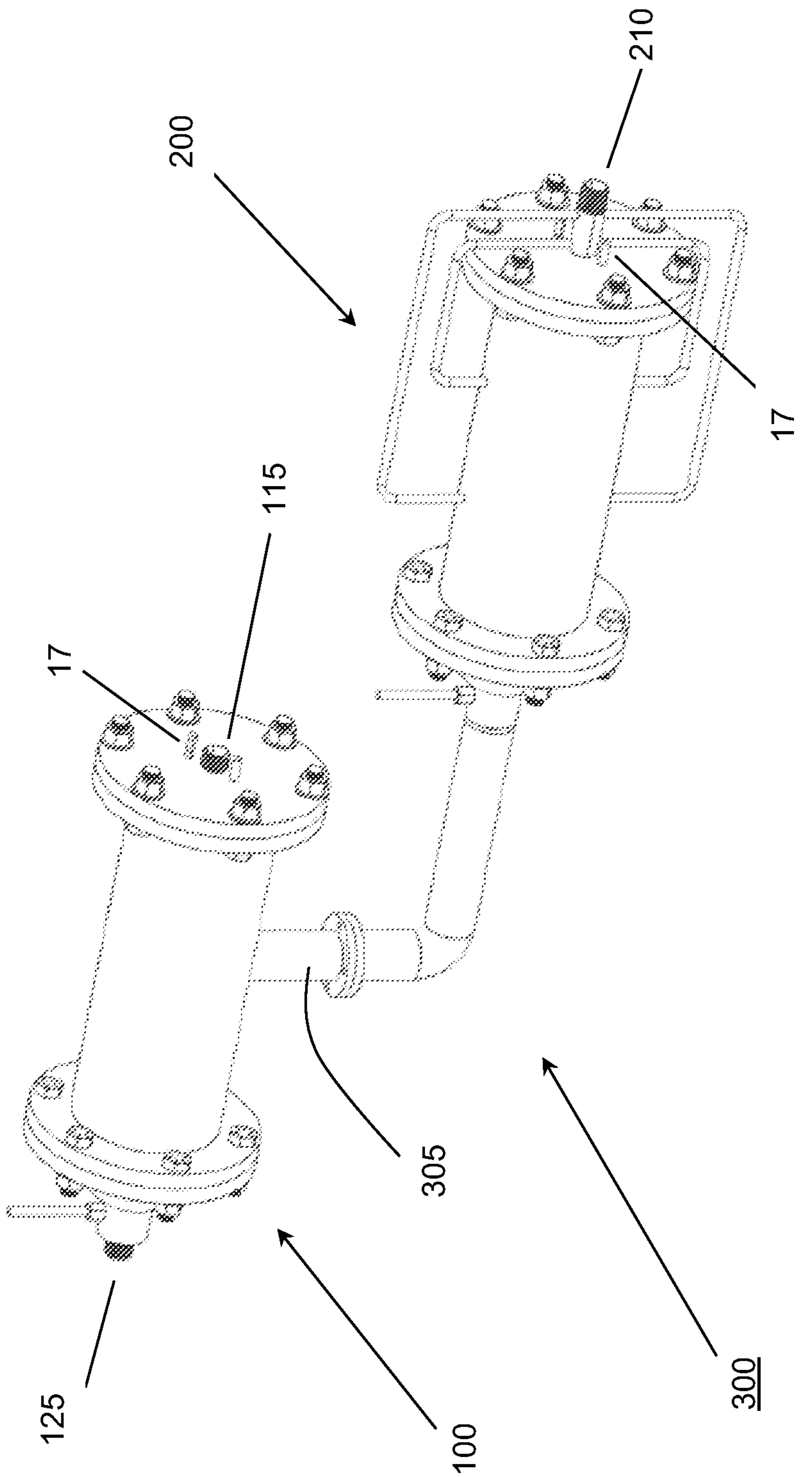
FIG. 13 is an overall view of the embodiment of the combination high temperature plasma and superheated steam generation device employing the double helical configured heating element.

FIG. 13 depicts a combination superheated steam and plasma generator 300 comprised of elements of both the plasma generating device 100 and the superheated steam generator 200. The combination generator 300 is the superheated steam generator 200 also comprising an auxiliary gas inlet 305 allowing for the introduction of gas as well as water to the combination generator 300. As with the plasma generating device 100 of FIGS. 6-8 this device 100 has a "primary" element 10 of a double helical configuration. The attached superheated steam generator 200 has a "secondary" heating element 10 to produce the superheated steam that is introduced into the casing 120 of plasma generating device 100.

It is anticipated that individual units of the plasma generator 100 and the superheated steam generator 200 may be coupled together in a device to obtain the benefits of superheated steam and high temperature plasma rather than combining the steam plasm generation into a single device. In one embodiment, for example, the exhaust port 125 of a superheated steam generator 200 may be connected to the intake end 103 or along the casing 102 of a plasma generator 100. The opposite case is envisioned as well where a plasma generator 100 feeds into a superheated steam generator 200 if desired.

DNA Coil Compared to Straight and Orthogonal Elements.

FIG. 14 represents a graph showing percent alignment of the flow along the heating element versus the output temperature. 100% represents when the flow is at 0° to the surface of the heating element. Here, a straight heating element is subjected to flow axially along its surface or at 0° to it. The surface of an orthogonal coil is at 90° to the flow and therefore is 0% in alignment. The DNA coil is between 0 and 100% and therefore between 0 and 90° to the flow. It has been found that The DNA coil provides the beast combination of high temperature and life of the configurations.

FIG. 15 represents a graph showing angle of heating element to the flow versus output temperature. 0° represents a flow parallel to the heating element (straight configuration) and 90° represents a flow perpendicular to the element surface (orthogonal coil). It has been determined that the optimal temperature can be achieved at an angle between 22.5° and 67.5° which is between 25% and 75% of 90°. The angle of the coil or helix segment can be measured from a centerline running axially along the channel containing the element.

The above descriptions provide examples of specifics of possible embodiments of the application and should not be used to limit the scope of all possible embodiments. Thus, the scope of the embodiments should not be limited by the examples and descriptions given but should be determined from the claims and their legal equivalents. For example, finned or dimpled elements with or without twists are contemplated. Far ranging fermion and boson interactive effects which are known as quantum separated are fully contemplated, although the physics of quantum separation is not fully understood. Heating elements and all parts of the device for a process air heater can have nano-particles, asperities or other surface enhancements/deformities etc. with combinations as to improve emissivity, corrosion and oxidation resistance or erosion, for example, as described in U.S. Pat. No. 9,249,492, "Materials Having an Enhanced Emissivity and Methods for Making the Same, U.S. Pat. No. 9,643,877, "Thermal Plasma Treatment Method" and U.S. Pat. No. 9,376,771, "Antimicrobial Materials and Coatings" which are incorporated by reference in their entireties.

We claim:

1. An industrial device for the heating of a fluid to a temperature capable of the generation of plasma comprising; a casing having an intake end and an exhaust end, an intake cap affixed to the intake end and an exhaust cap affixed to the exhaust end, wherein the intake cap comprises a fluid inlet allowing for the introduction of a first fluid into and through the casing and the exhaust cap comprises an exhaust port, at least one primary electrically charged heating element configured as a double helix comprising a first terminal delineating a first coil in a clockwise direction away from the first terminal around a central axis to a member apex where the member delineates a second coil in a counter-clockwise direction towards the first terminal ending at a point adjacent to the first terminal thereby forming a second terminal wherein the first coil and the second coil do not come into contact and define a void within the first and second coil and along the central axis placed within the casing, a refractory lining within the casing surrounding and in contact with the at least one primary heating element wherein the first fluid passes from the fluid inlet through and around the at least one primary heating element and the refractory lining wherein the intake cap further comprises a fluid distribution manifold and at least one water line communicating with and projecting from the manifold to specifically positioned openings along the outer surface of the casing, allowing for the introduction of water into and through the casing and through the refractory lining wherein water passes from the water inlet and is distributed to and through the refractory lining and into contact with the at least one primary heating element efficiently picking up heat from the at least one primary heating element and the refractory lining and thereby generating a superheated steam and a plasma.

2. The device of claim 1 further comprising a fluid source.

3. The device of claim 1 wherein the first fluid is a gas.

4. The device of claim 1 wherein the first fluid is water.

5. The device of claim 3 wherein the gas is air.

6. The device of claim 1 wherein the void defined by the first and second coil contains a core of refractory material.

7. The device of claim 1 wherein the refractory lining is comprised of porous material.

8. The device of claim 1 wherein the at least one primary heating element is threaded into the refractory lining.

9. The device of claim 1 wherein the at least one water line is positioned outside of the casing.

10. An industrial device for the heating of a fluid to a temperature capable of the generation of plasma comprising; a casing having an intake end and an exhaust end, an intake cap affixed to the intake end and an exhaust cap affixed to the exhaust end, wherein the intake cap comprises a fluid inlet allowing for the introduction of a first fluid into and through the casing and the exhaust cap comprises an exhaust port, at least one primary electrically charged heating element configured as a double helix comprising a first terminal delineating a first coil in a clockwise direction away from the first terminal around a central axis to a member apex where the member delineates a second coil in a counter-clockwise direction towards the first terminal ending at a point adjacent to the first terminal thereby forming a second terminal wherein the first coil and the second coil do not come into contact and define a void within the first and second coil and along the central axis placed within the casing, a refractory lining within the casing surrounding and in contact with the at least one primary heating element wherein the first fluid passes from the fluid inlet through and around the at least one primary heating element and the refractory lining efficiently picking up heat from the at least one primary heating element and the lining, a fluid inlet positioned through the casing allowing the projection of a second fluid through the casing and the refractory lining and along and in contact with the at least one primary heating element wherein the second fluid is heated to a temperature capable of generating plasma by at least one secondary electrically charged heating element configured as a double helix comprising a first terminal delineating a first coil in a clockwise direction away from the first terminal around a central axis to a member apex where the member delineates a second coil in a counter-clockwise direction towards the first terminal ending at a point adjacent to the first terminal thereby forming a second terminal wherein the first coil and the second coil do not come into contact and define a void within the first and second coil and along the central axis contained within a second casing, thereby generating a plasma.

11. The device of claim 10 wherein the second fluid is superheated steam.

12. The device of claim 10 wherein the second fluid is a gas.

* * * * *